April 28, 1931.  J. E. ROUSEK ET AL  1,802,353
WEATHER SHIELD
Filed Sept. 19, 1929
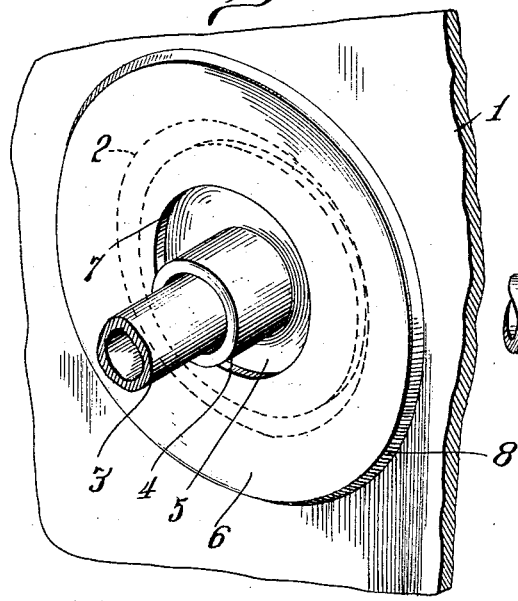
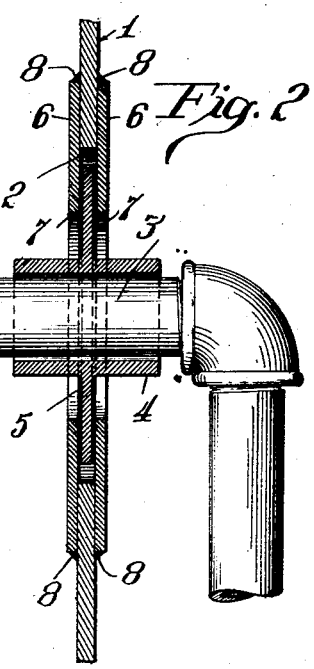
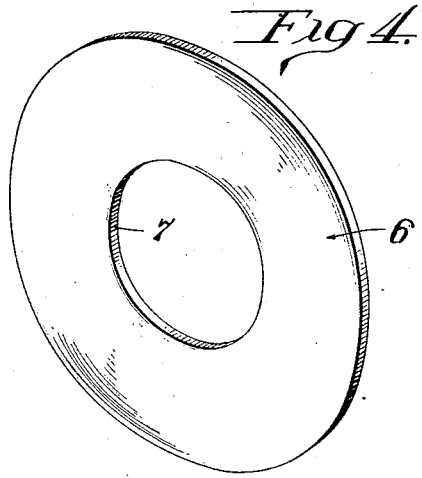
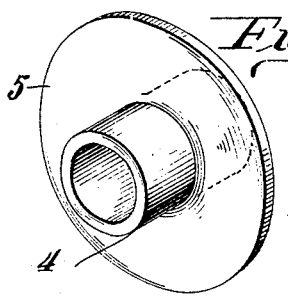
Inventors
John E. Rousek
and Charles A. Henry
By Barnett Truman
Attorneys Patented Apr. 28, 1931

1,802,353

UNITED STATES PATENT OFFICE

JOHN E. ROUSEK, OF CHICAGO, ILLINOIS, AND CHARLES A. HENRY, OF WEST BURLINGTON, IOWA

WEATHER SHIELD

Application filed September 19, 1929. Serial No. 393,767.

This invention relates to certain new and useful improvements in weather shields, and more particularly to a protective device for closing the opening around a pipe where it projects through the wall of a housing, such as a locomotive cab, whereby cold air, rain and snow are excluded without interfering with the necessary relative movements between the pipe and the wall through which it projects.

It is necessary that certain pipes project through the front wall of a locomotive cab for conveying air or steam from the inside of the cab to the outside or vice versa. The holes where these pipes project through the cab wall have always been a source of considerable annoyance. If they are too large, they are objectionable as admitting too much cold air, and also at times rain or snow. If the holes are too small and clamp tightly to the pipe, the vibration of the cab will cause wear on the pipe and a broken steam connection often results.

The present invention aims to provide a device which will keep the opening around the pipe tightly closed at all times and still permit the cab wall to vibrate with relation to the pipe, or permit the pipe to move with relation to the wall. Briefly described, the device comprises a thimble through which the pipe has a slidable fit, and a plurality of overlapping plates or flanges respectively connected with the cab wall and the thimble, so that relative movements are permitted without uncovering any part of the opening between the pipe and wall.

The principal object of this invention is to provide a shielding device of the type briefly referred to hereinabove, and disclosed more in detail in the specifications which follow.

Another object is to provide an improved flexible wall connection between a pipe and the wall through which it projects.

Another object is to provide an improved shielding device for preventing wind or rain from passing through the opening in a wall through which a pipe projects.

Other objects and advantages of this invention will be more apparent from the following detailed description of one approved form of device embodying the principles of this invention.

In the accompanying drawings:

Fig. 1 is a perspective view of the shielding device as applied to a pipe and wall.

Fig. 2 is a vertical section through the wall and shield.

Fig. 3 is a perspective view of the thimble.

Fig. 4 is a perspective view of one of the protecting plates or washers.

At 1 is indicated a section of the front wall of a locomotive cab, this wall usually being in the form of a fairly thick metal plate. This wall has a rather large opening 2 formed therein, through which projects a section 3 of a pipe for conducting air, steam or some other fluid through the wall of the cab.

The shielding device comprises a cylindrical thimble 4, having a fairly loose fit about the pipe 3, so that the pipe may move longitudinally therethrough, the thimble being of sufficient length to prevent the flow of any material quantity of cold air, water or other fluid through the space between the thimble and pipe. Extending centrally outward at right angles to the axis of the thimble is an annular flange or plate 5, of materially less diameter than the opening 2 in the cab wall 1, and preferably of somewhat less thickness than the wall 1. A pair of similar protecting plates 6, which may be in the form of annular metal washers, as best shown in Fig. 4, are formed with central openings 7 of materially greater diameter than the outer diameter of thimble 4. These plates or washers 6 are attached to opposite sides of wall 1 so as to overlap the sides of flange 5, as best shown in Fig. 2. These plates 6 are preferably attached to the wall 1, by welding, as indicated at 7, or they may be bolted to the wall or any other suitable attaching means may be used.

It will now be apparent that as the cab wall 1 vibrates, it may move in any direction without necessitating a corresponding movement of the pipe 3. Any movements in the plane of the wall are permitted by the overlapping plates 5 and 6. Movements longitudinally of pipe 3 are permitted by the sliding thimble 4. At all times the opening about the pipe is closed so as to prevent the passage of any material amount of fluid through this opening.

The opening 2 need not be circular, and the size and conformation of the flange 5 and plates 6 may be varied accordingly.

While the structure shown by way of example is preferred, the plates 2 might be secured to the flange 5 and have overlapping movement against the opposite faces of wall 1. Or the positions of the members 5 and 6 might be reversed, that is, the flange 5 could be secured to the wall 1 and the plates 6 to thimble 4. Such other variations are contemplated as would come within the scope of the claim which follows.

While this device has been designed particularly for use in a locomotive cab, it will be apparent that it is adapted for use in any situation where a pipe or rod projects through a wall or housing.

We claim:

A weather-shield comprising the combination with a wall having an opening therein, and a pipe extending through the opening, of means for sealing the opening while permitting relative vibratory movements of the pipe and wall, said means comprising a thimble longitudinally slidable on the pipe there being an outwardly extending flange on the thimble positioned loosely within the opening and in substantial alignment with the wall, and a pair of plates provided with central openings, the plates being secured to opposite sides of the wall and overlapping the two faces of the flange.

JOHN E. ROUSEK.
CHARLES A. HENRY.